No. 725,581. PATENTED APR. 14, 1903.
D. E. McLAUGHLIN.
FREIGHT CAR DOOR.
APPLICATION FILED AUG. 9, 1902.
NO MODEL.
Fig. 1.
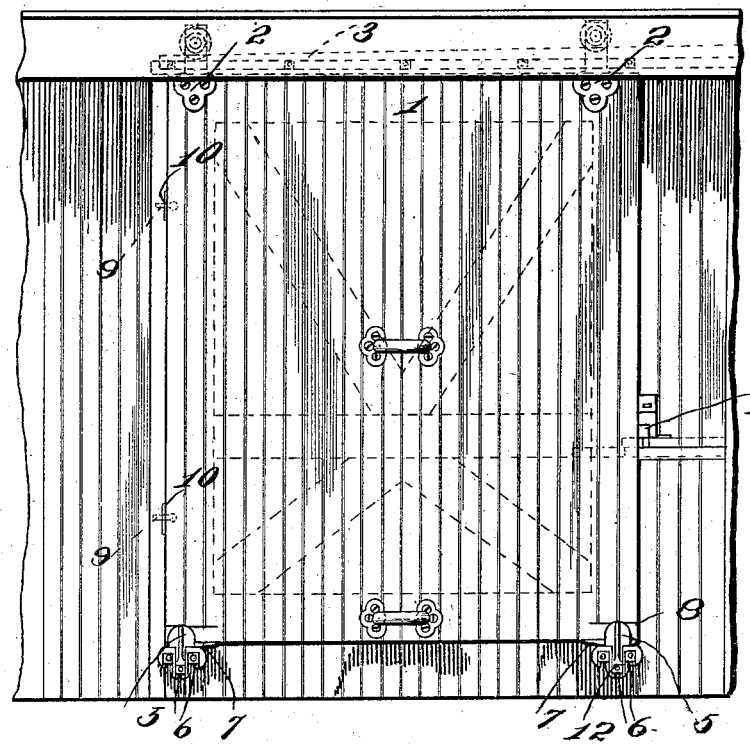
Fig. 2.
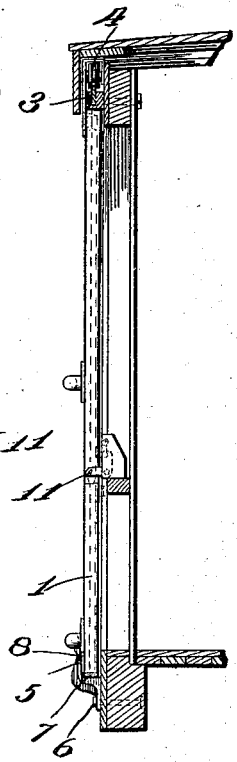
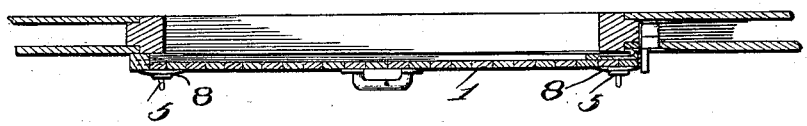
Fig. 3.
Witnesses
L. G. Handy
Ruth J. Mitchell
Inventor
Dorsey E. McLaughlin,
By
Mason, Fenwick & Lawrence
Attorney

UNITED STATES PATENT OFFICE.

DORSEY E. McLAUGHLIN, OF TACOMA, WASHINGTON.

FREIGHT-CAR DOOR.

SPECIFICATION forming part of Letters Patent No. 725,581, dated April 14, 1903.

Application filed August 9, 1902. Serial No. 119,086. (No model.)

*To all whom it may concern:*

Be it known that I, DORSEY E. McLAUGHLIN, a citizen of the United States, residing at Tacoma, in the county of Pierce and State of Washington, have invented certain new and useful Improvements in Freight-Box-Car Doors; and I do hereby declare the following to be a full, clear, and exact description of the invention, such as will enable others skilled in the art to which it appertains to make and use the same.

The present invention relates to improvements in car-doors, and particularly to cardoors for freight-cars; and it consists in a door slidably mounted upon a car and traveling upon a suitable track, together with means for lifting the door slightly from the track when it is in its closed position.

It also consists of certain other novel constructions, combinations, and arrangements of parts, as will be hereinafter fully described and claimed.

In the accompanying drawings, Figure 1 is a side elevation of a car, showing a door thereon. Fig. 2 is a vertical sectional view through the car-door and a portion of the car carrying the same. Fig. 3 is a horizontal sectional view through the said door and a portion of the side of a car.

The car-door claimed in the present application is so mounted upon a car that it may be rolled back and forth upon a suitable track before the door-opening of a car and is provided with means for lifting the weight of the door from the wheels or rollers carrying the same when the door is in its closed position, so that the jarring and movement of the car in traveling will not be a source of constant wear upon the supporting wheels or rollers. The door is also formed and constructed so that it cannot be pulled or pried away from the side of a car when it is in its closed position.

The door 1 is provided with suitable hangers 2 2, which extend upwardly from the door and are bent over a supporting-track 3, which is secured to the side of a car above the dooropening. These hangers 2 are provided with antifriction wheels or rollers 4, preferably of the flanged type, so that they are adapted to run upon the upper edge of the said track 3, their flanges guiding them in such movement.

The track 3 is arranged with its upper bearing-surface at a slight incline, so that the door mounted thereon will have a tendency to automatically close, particularly when the car is traveling. The jar and movement of the car in traveling will of course cause the door to roll down the inclined track to its inclosed position. This is quite an advantage, since the door of a car thus mounted would close, though the car might have been started on a trip or a journey with the door carelessly left open.

Operating in connection with the inclined track of the door are guiding and supporting brackets 5, which engage the lower edge of the door 1. These brackets are bolted to the side of the car by suitable bolts or lag-screws, as 6, while the door-engaging portions thereof project outwardly from said car and upwardly around the lower edge of the door. The lower edge of the door is provided with downwardly-extending projections 7 at its corners, so that when the door is in its closed position it will be slightly raised by the projection 7 sliding upon the brackets 5. These projections may either be thickened end portions of a protecting-strip secured to the lower edge of a door or may be simply pieces of metal tapered at their ends secured at the corners of the door. The principal feature in these pieces is the provision of means extending below the general contour of the door edge by which the door will be raised when in its closed position to lift the supporting-rollers 4 from the track 3. By this means when the car is traveling the constant jarring and moving of the door will not wear upon the wheels and the bearings thereof. The lifting projections 7 are, however, made quite short, so that when the door is to be opened a slight movement will push the weight of the door from the brackets 5 and permit the door to be movably supported by the antifriction wheels or rollers 4. Similar thickened projections 8 may be placed upon the outer face of the door 1 at its corners for engaging the upwardly-projecting arms of the brackets 5 when the door is closed to hold the said door tightly against the side of the car. Of course as soon as the door is moved slightly in opening it these projections 8 will be carried out of engagement with the arms of the bracket 5 and the door will be comparatively loose upon its supporting-rollers and easily moved back and forth.

To prevent the pulling or prying of the door from the side of the car at its vertical edges, I provide projections 9 along one edge of the door, which extend into sockets 10 when the door is closed, the said sockets being formed in the limiting-jamb of the door. A suitable locking means 11 of any desired formation can also be employed at the rear edge of the door to secure it upon that side not only against being opened, but against being pulled or pried from from the side of the car. The brackets 5 are provided with projecting flanges 12, which surround or inclose the nuts or heads of the bolts or lag-screws 6 except on one side, so that they cannot be turned. Thus the said brackets 5 cannot be removed while the door is closed, since it is necessary to raise the brackets in order to release the bolt-heads or nuts from their engagement with the said flanges 12.

A car-door constructed in accordance with the above description can be easily moved for opening and closing it and when in its closed condition is tight and snug in its relation to the side of a car. It cannot be pried off easily when opened in any unlawful manner. The mounting of the door also is such that if the door is accidentally left open when a car is starting upon a journey the movement and jar of the car in traveling will soon cause the door to close.

Having now fully described my invention, what I claim as new, and desire to secure by Letters Patent, is—

1. A car-door mechanism, comprising a door proper, antifriction means supporting said door, and means carried by the door for lifting it in its closed position from the said antifriction supporting means to prevent wear thereon, substantially as described.

2. A car-door mechanism, comprising a door proper, wheels or rollers supporting said door upon a suitable track, projections on the lower edge of the door, and brackets on the car-body for engaging said projections when the door is slid to its closed position to lift the door from its supporting-wheels, substantially as described.

3. A car-door mechanism, comprising a door proper, an inclined track for supporting the same, antifriction-rollers engaging the said track, the said track causing the door to close under the movement of the car, lifting projections on the lower edge of the door, supporting-brackets for guiding and lifting said door, the lifting projections being so arranged that when the door slides to its closed position weight will be lifted from the rollers to prevent wear thereon, substantially as described.

In testimony whereof I hereunto affix my signature in presence of two witnesses.

DORSEY E. McLAUGHLIN.

Witnesses:
CARL STROUT,
FRANK J. MILLER.